Aug. 1, 1961    F. A. DOBSON ET AL    2,994,492
CONVERTIPLANE, AND METHOD OF OPERATING AN AIRCRAFT
Filed July 30, 1954    11 Sheets-Sheet 4
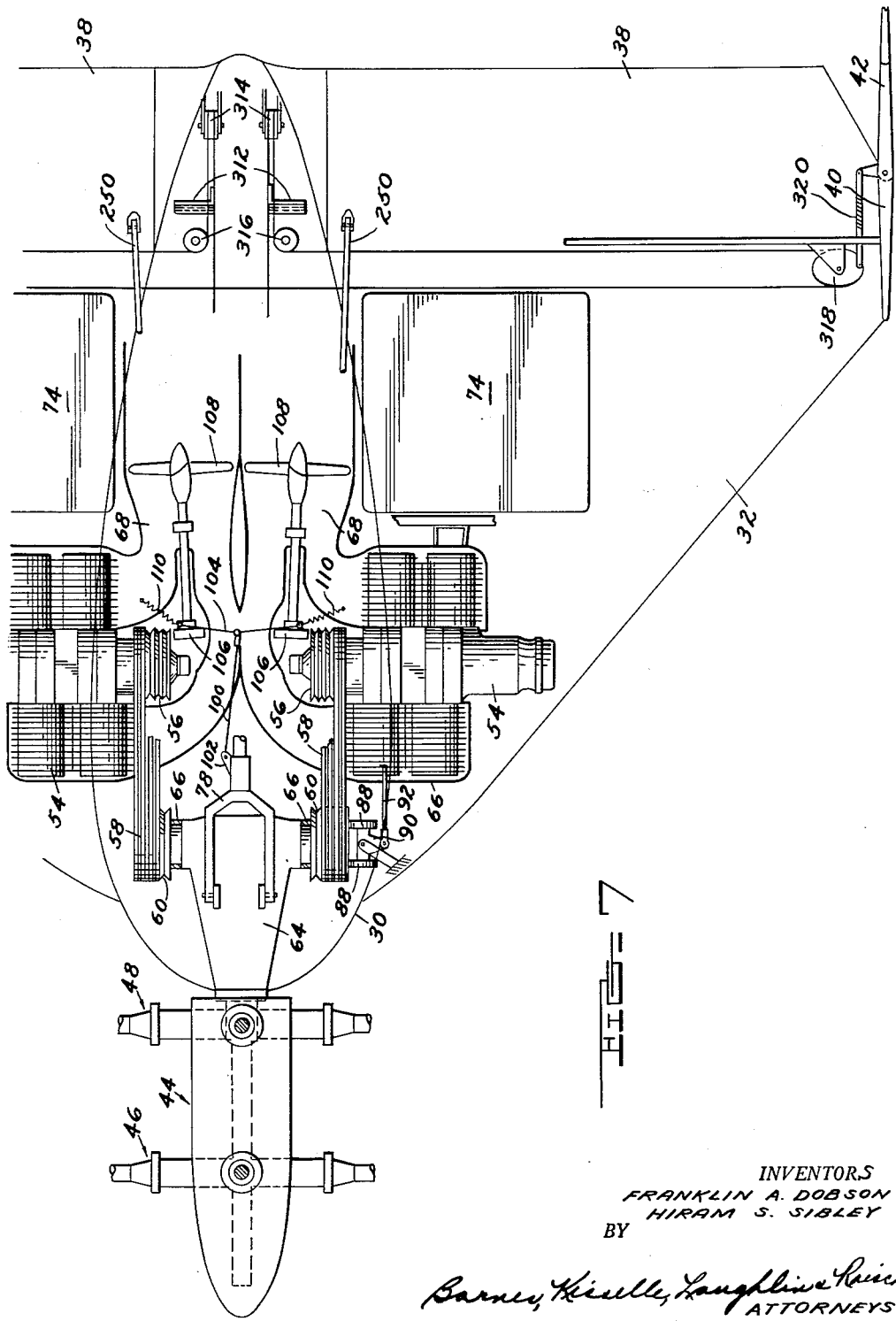
INVENTORS
FRANKLIN A. DOBSON
HIRAM S. SIBLEY
BY
ATTORNEYS

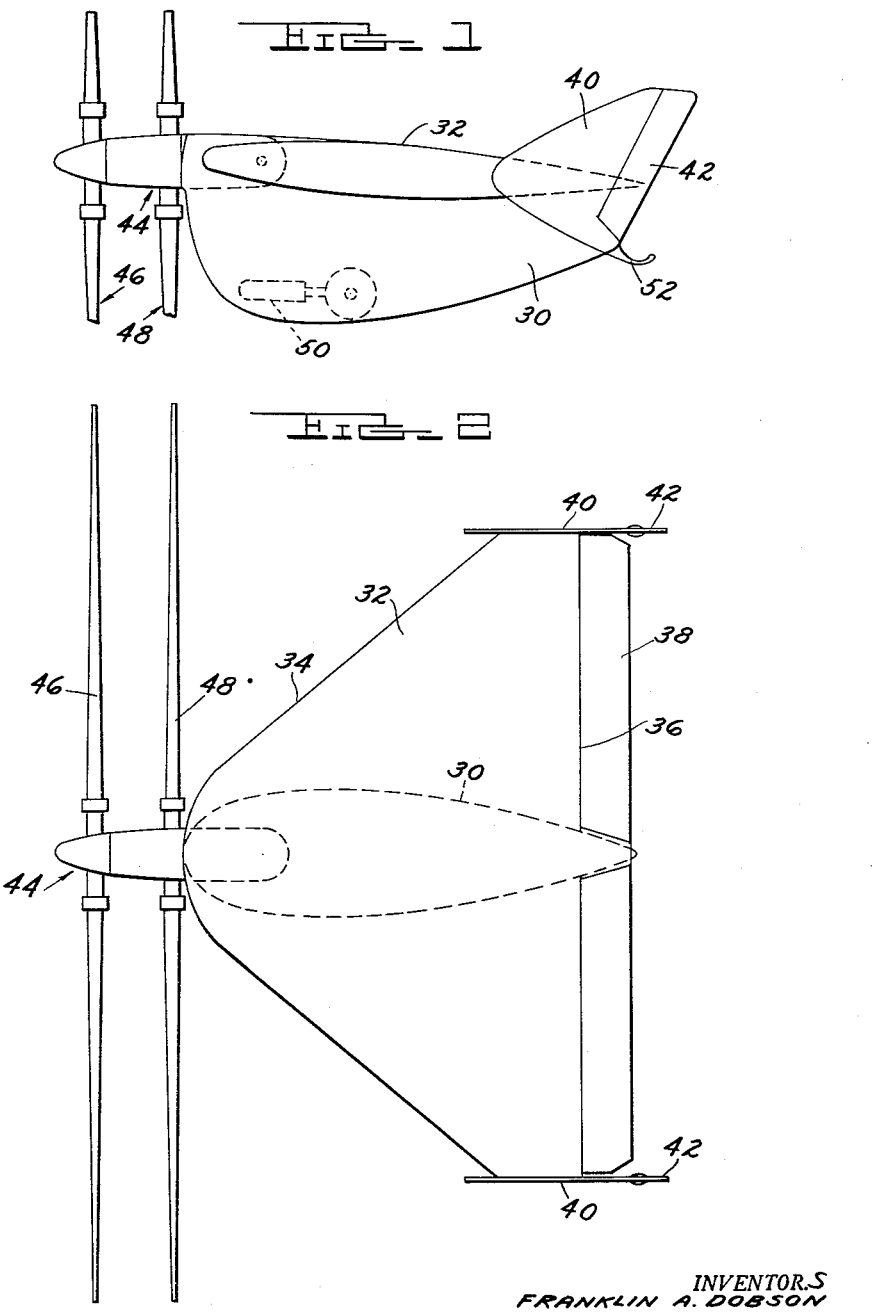

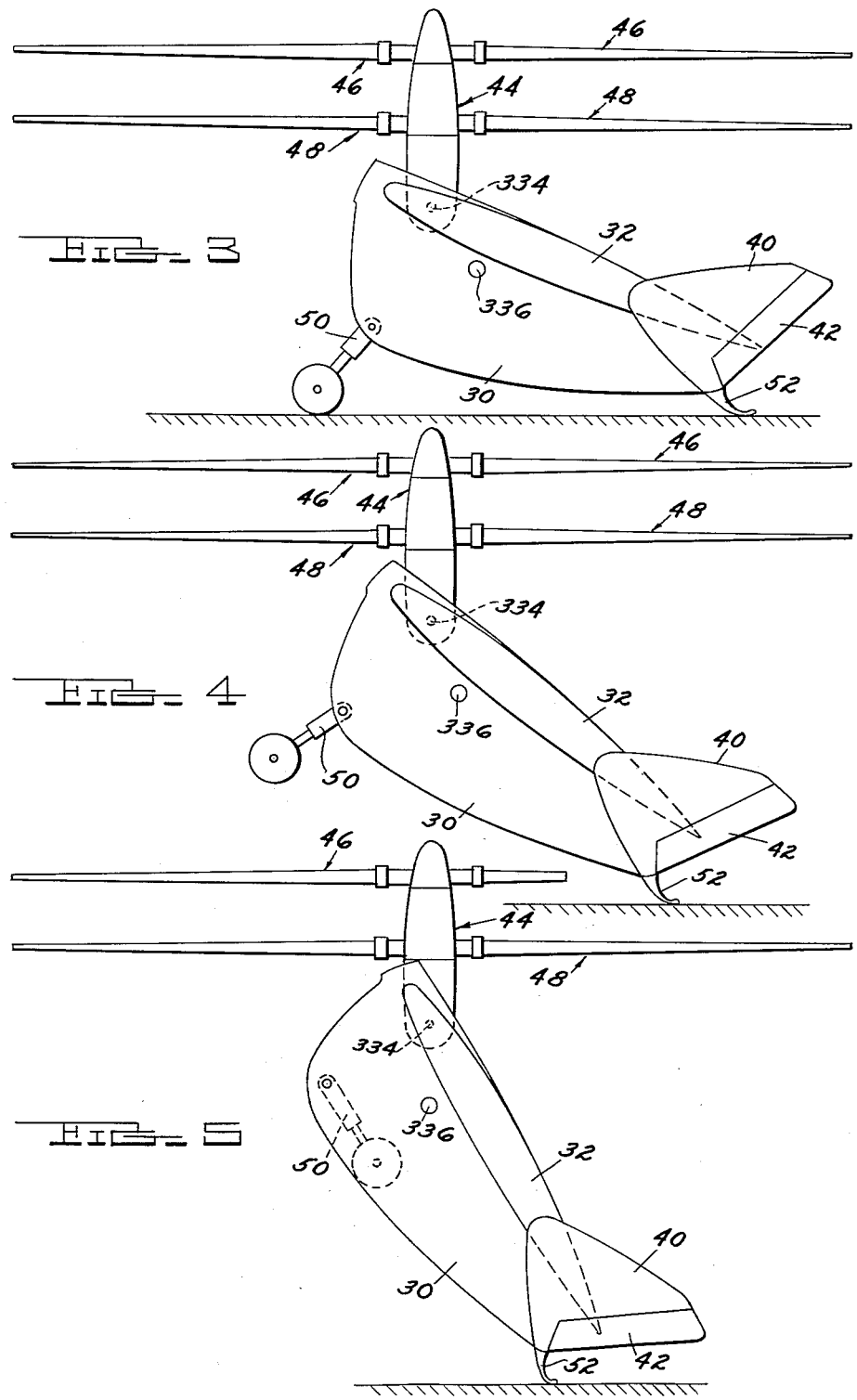

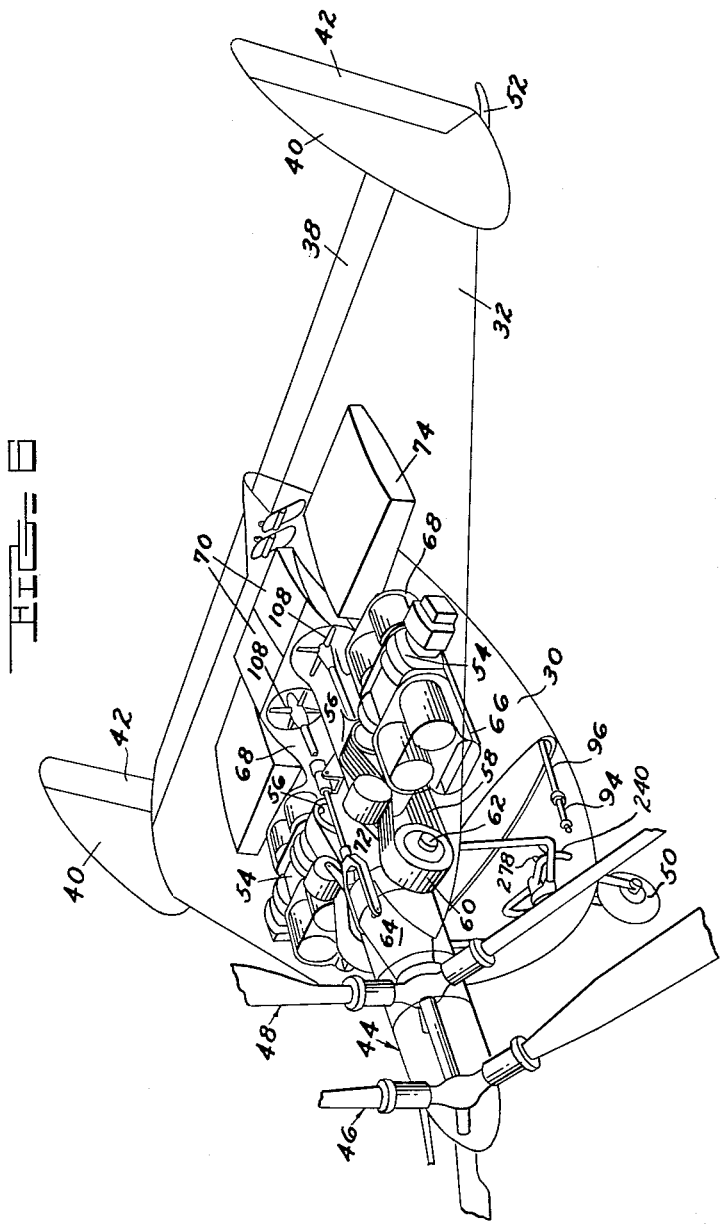

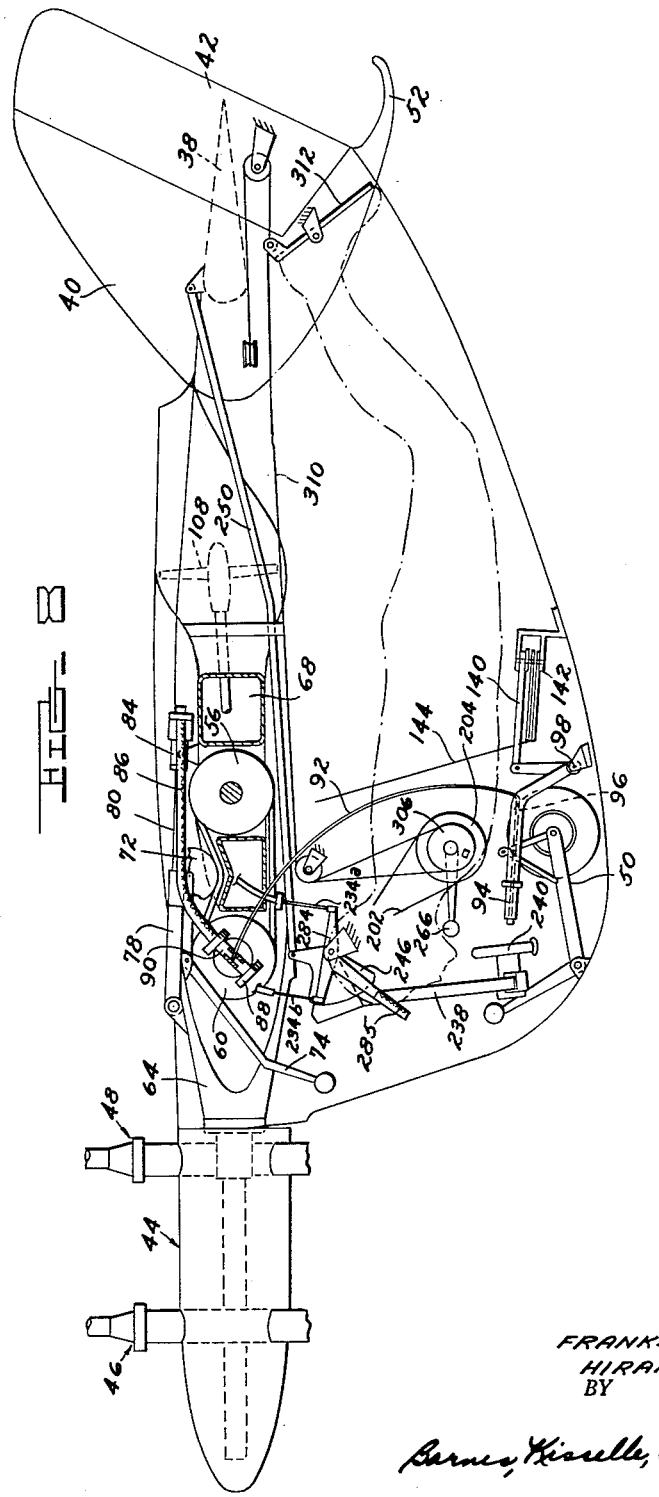

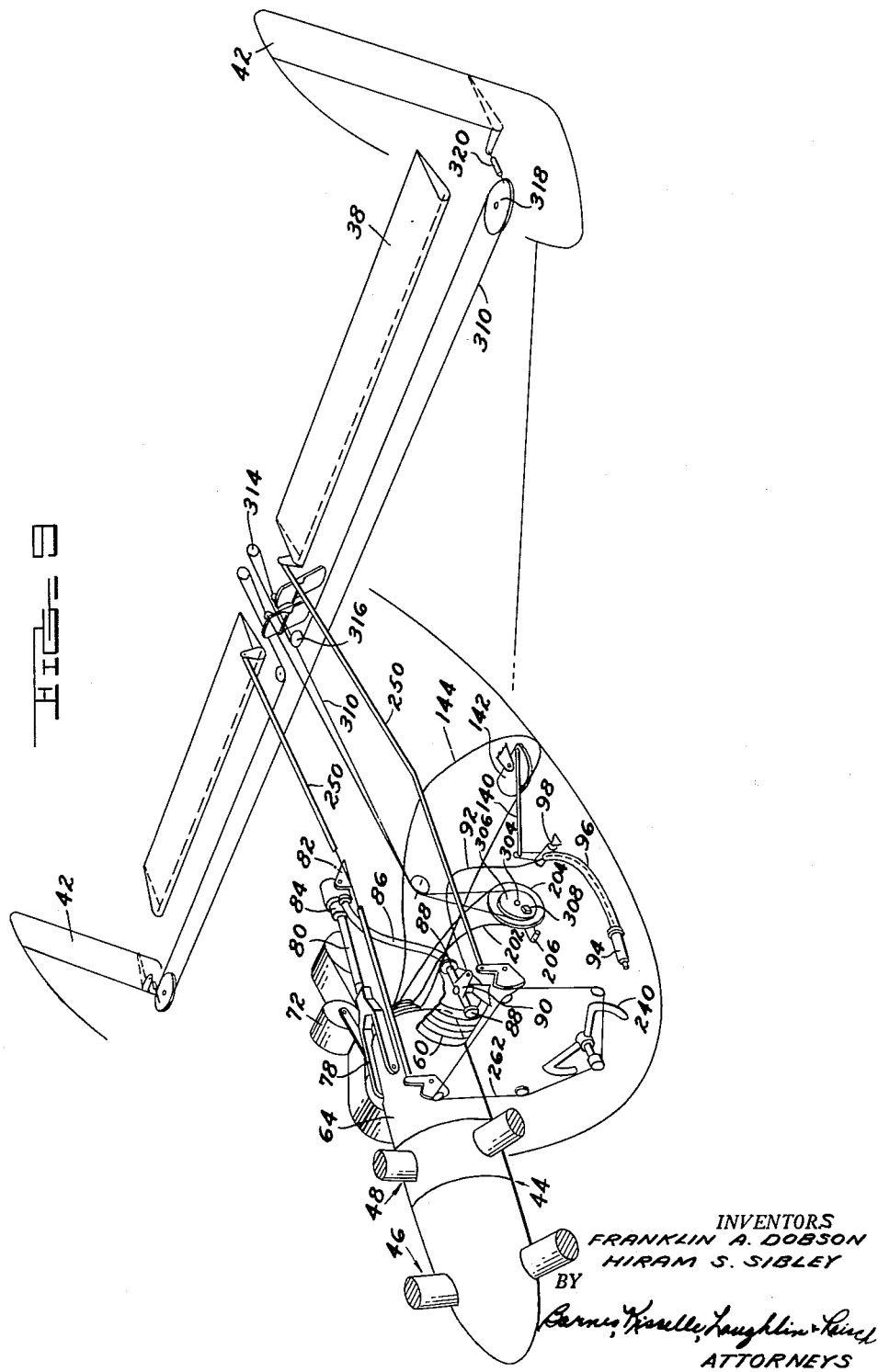

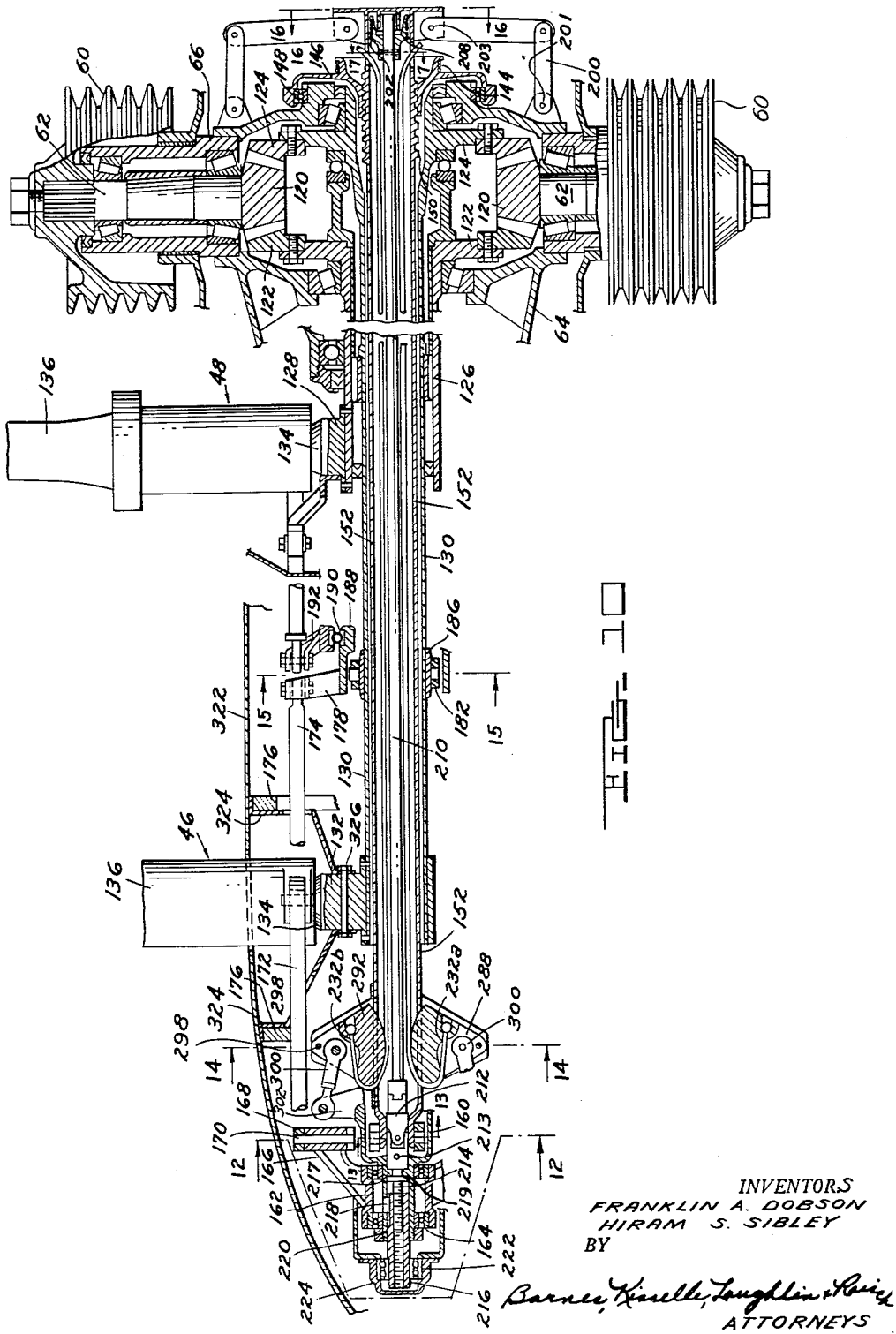

Aug. 1, 1961   F. A. DOBSON ET AL   2,994,492
CONVERTIPLANE, AND METHOD OF OPERATING AN AIRCRAFT
Filed July 30, 1954   11 Sheets-Sheet 8
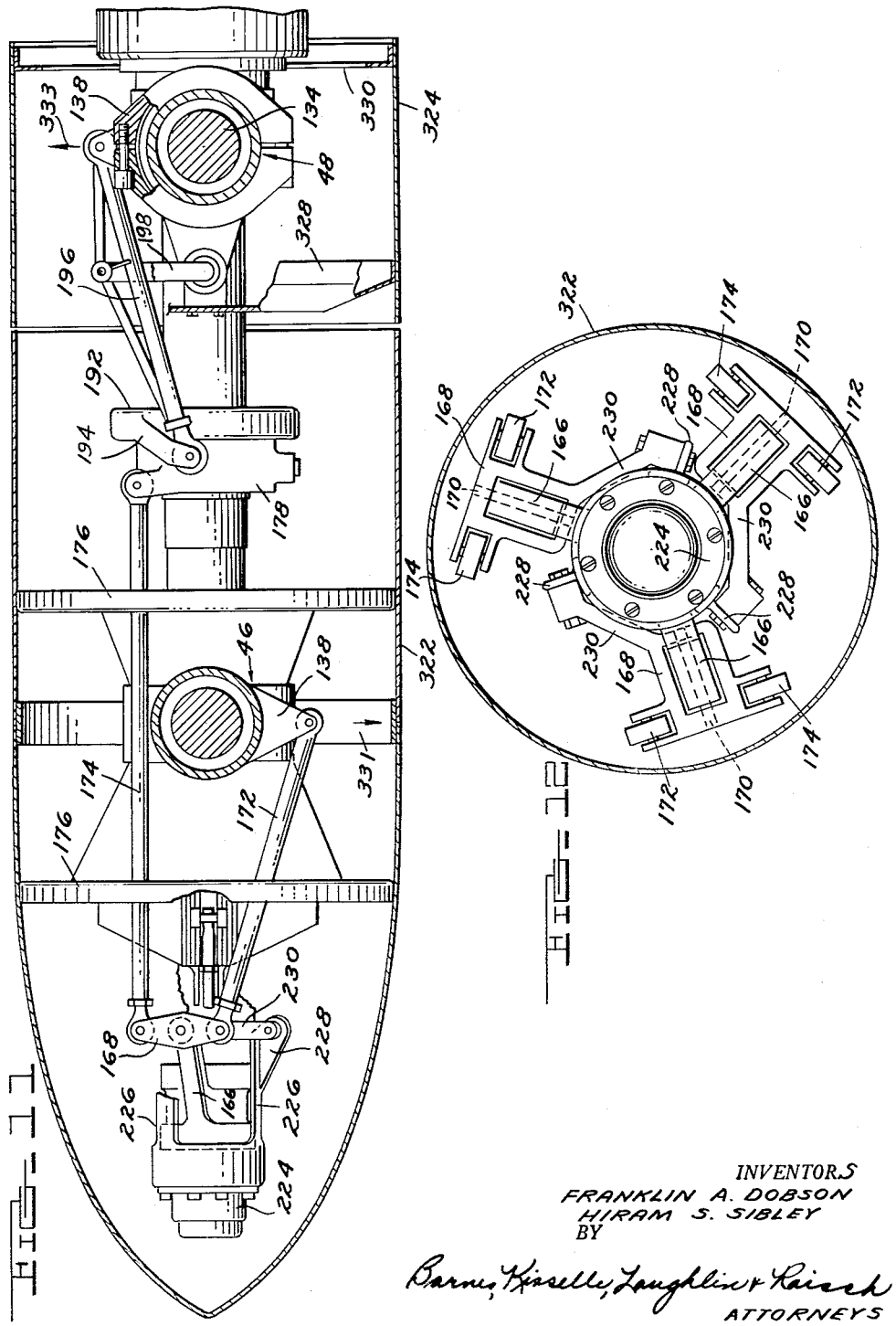
INVENTORS
FRANKLIN A. DOBSON
HIRAM S. SIBLEY
BY
ATTORNEYS

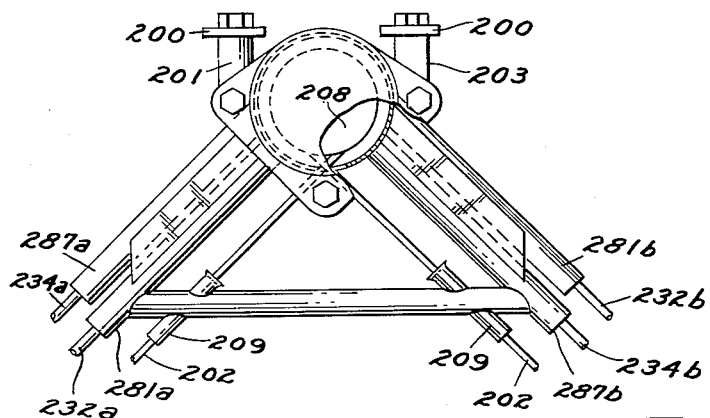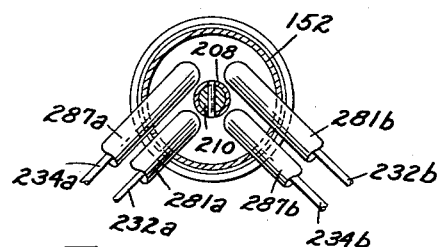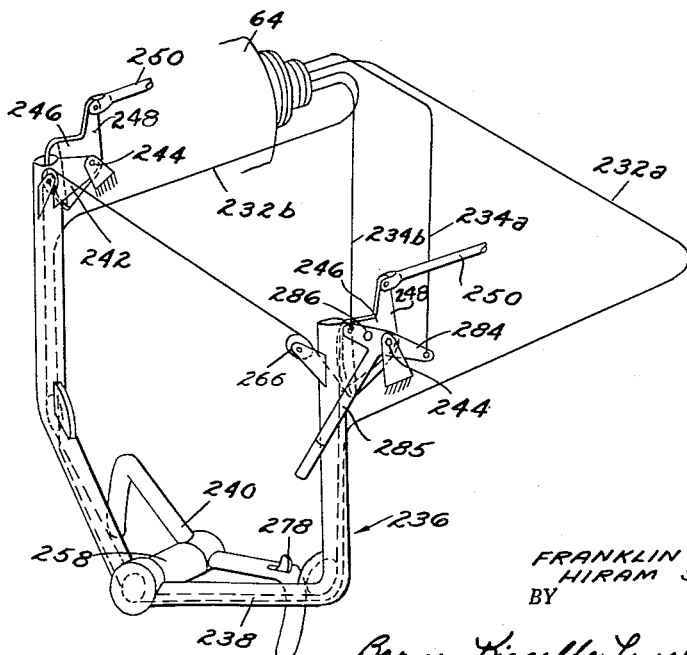

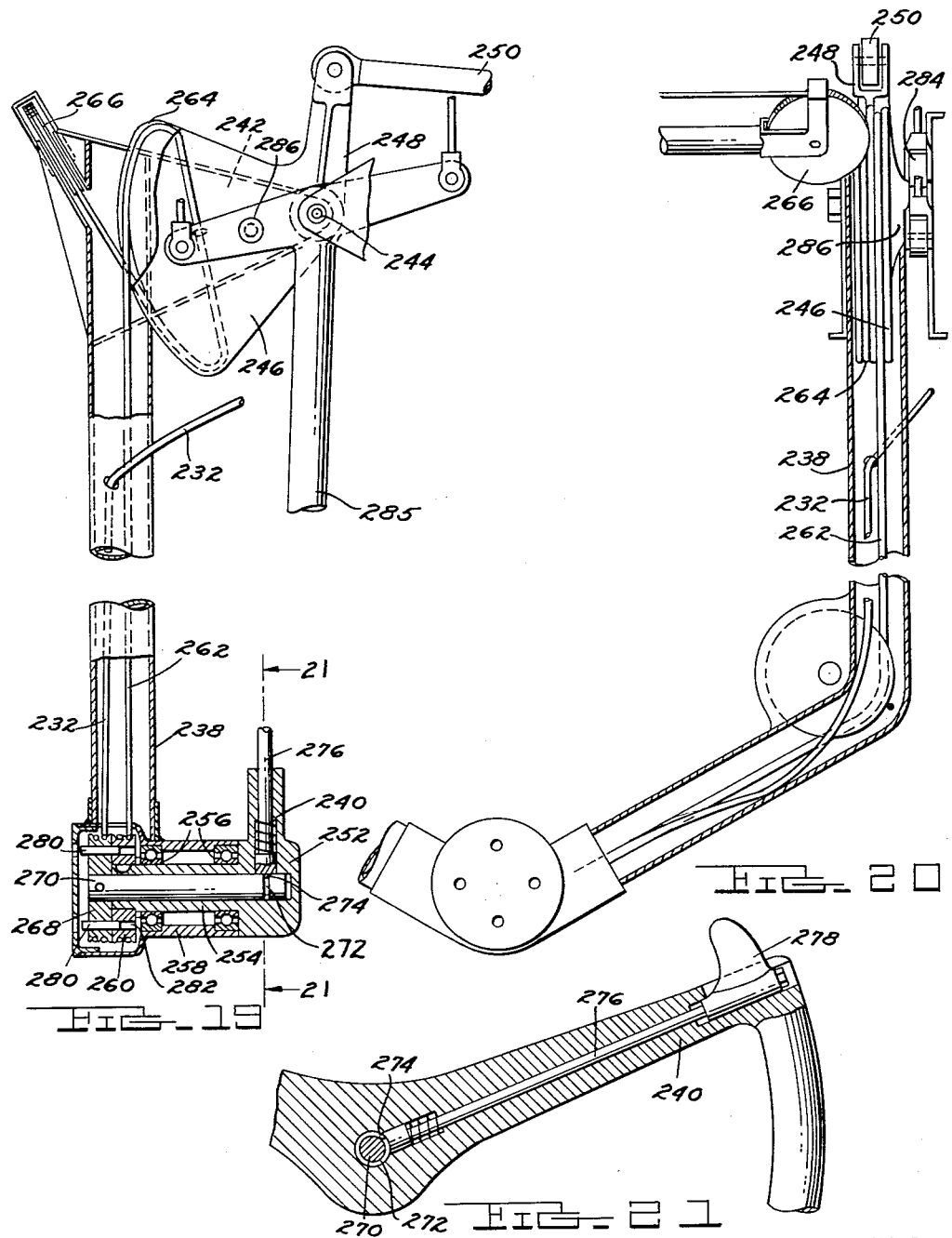

United States Patent Office 2,994,492
Patented Aug. 1, 1961

2,994,492
CONVERTIPLANE, AND METHOD OF OPERATING AN AIRCRAFT
Franklin A. Dobson, 8205 Calmosa Ave., Whittier, Calif., and Hiram S. Sibley, Lido Isle, Calif.; said Sibley assignor to said Dobson
Filed July 30, 1954, Ser. No. 446,904
10 Claims. (Cl. 244—7)

This invention relates to aircraft and more particularly to the type of aircraft commonly referred to as a convertiplane. The term "convertiplane" is usually used to identify aircraft which can land and take off vertically and can cruise at high speed in level flight.

The advantages of conventional airplanes, and their ability to transport passengers and cargo at high speeds over great distances are well known. The major disadvantage of such airplanes is the long runway required, and the difficulty and danger attending take-off and landing, particularly in case of engine failure or poor visibility.

Aircraft design has progressed to a point where structural failures, or loss of control during flight, are almost unknown. However, accidents still occur during take-off and landing, because of the high speed required by a fixed-wing airplane to support its weight. During take-off and landing, the smallest error by the pilot, or any malfunctioning of equipment or engine, can have disastrous results. If speed drops below a certain minimum (which varies with atmospheric conditions, altitude and loading of the airplane), lift will be lost, and the airplane will probably go out of control and crash. When it is realized that every take-off and landing of an airplane is made at a speed just above this critical speed, it become obvious how much skill and judgment are required of the pilot, and how unlikely it is that the general public will ever be able to fly this type of aircraft with safety.

Because of the long runways required for conventional airplanes and the fact that after leaving the ground, an airplane climbs so slowly that it cannot clear any immediate obstacle of any size, airports must be located in uninhabited areas, usually far from centers of population.

Another disadvantage of conventional airplanes is that persons who own their own airplanes must store them at an airport, usually far from their homes. This is not only inconvenient, but quite expensive as well.

Many of the disadvantages of the airplane are overcome by the helicopter, which can take off and land vertically, and in addition hover and even fly sideways and backwards if desired. However, the helicopter as we have it today is extremely complicated, inefficient, and so limited in payload, range and speed that its use is limited to specialized missions such as rescue operations and short flights over impassable terrain.

It is apparent that if the good qualities of the airplane and the helicopter could be combined in one vehicle, the resulting aircraft would be much more useful and valuable than present types of aircraft. Many attempts have been made heretofore to work out a design which would accomplish this result, but the attempt to satisfy conflicting airplane and helicopter requirements has usually produced a design which was neither a good airplane nor a good helicopter. In addition, mechanical and structural complications of designs proposed to date would increase the cost and weight to prohibitive values.

One of the objects of this invention is to provide a convertiplane which is simple in design and efficient in operation, both as an airplane and as a helicopter.

Another object is to provide a convertiplane which performs the maneuvers of take-off, climb and transition to level flight in a simple and logical manner, with no unnatural or dangerous intermediate operations (such as starting or stopping rotors or propellers).

Another object is to provide a high-speed aircraft suitable for private use, which can take off and land from a small area, and is compact and robust enough to be stored in an ordinary garage.

Another object is to provide an aircraft suitable for mass production.

Another object is to provide a convertiplane design which utilizes only tried and proven aircraft components which do not require long and costly development programs to make them work satisfactorily.

Another object is to provide a convertiplane design which permits a safe and convenient method of landing in case of power failure.

Another object is to employ a configuration of aircraft which is suitable for speeds up to and above the speed of sound.

Another object is to provide a convertiplane construction having twin engine and twin rotor operation, by which failure of either engine or either rotor will not endanger the safety of the aircraft or its occupants.

Another object is to provide a convertiplane design which makes for simple, positive and powerful control of the aircraft during all phases of take-off, flight and landing.

Another object is to provide a convertiplane with a low, safe center of gravity and overall height combined with ease of access when resting on the ground.

In the drawings:

FIG. 1 is a side elevation of the convertiplane of this invention in level flight.

FIG. 2 is a plan view of the convertiplane also in level flight.

FIG. 3 is a side view of the convertiplane resting on the ground in a position ready for take-off.

FIGS. 4 and 5 are side views showing positions the plane successively occupies in take-off.

FIG. 6 is a perspective view in phantom and somewhat diagrammatic showing generally the engine arrangement of the convertiplane.

FIG. 7 is a fragmentary top view in phantom of the arrangement shown in FIG. 6.

FIGS. 8 and 9 are side and perspective views respectively of the convertiplane showing the control cable arrangement thereof for a prone position of the pilot.

FIG. 10 is a fragmentary longitudinal sectional view of the rotor-gearbox assembly on which the counter-rotating propellers are mounted.

FIG. 11 is a view of the rotor assembly at right angles to the view illustrated in FIG. 10.

FIG. 12 is a sectional view taken generally along the line 12—12 in FIG. 10.

FIG. 16 is a sectional view taken generally along the line 16—16 in FIG. 10.

FIG. 17 is a sectional view taken generally along the line 17—17 in FIG. 10.

FIG. 18 is a perspective view somewhat diagrammatic of the control stick.

FIG. 19 is a fragmentary side elevational view partly in section of the control column.

FIG. 20 is a fragmentary front elevation partly in section of the control column.

FIG. 21 is a sectional view taken along the line 21—21 in FIG. 19.

Figure 13:
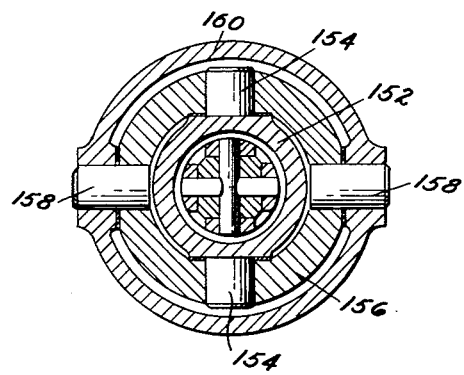
FIG. 13 is a sectional view taken generally along the line 13—13 in FIG. 10.

Referring to FIGS. 1 and 2, the convertiplane there shown includes a fuselage 30 of conventional streamline form and a wing 32 which is attached to the upper part of the fuselage as illustrated. The wing 32 has a sharply swept back leading edge 34 and a substantially straight trailing edge 36. This type of wing, usually referred to as a delta wing, is exceptionally efficient at high speeds and is very stable at low speeds. In addition, the delta wing possesses other advantages which make this wing admirably suited for the convertiplane construction of the instant design. Along the trailing edge 36 of the wing, two wing flaps 38, one on each side of the fuselage 30, are mounted for pivotal movement about an axis in the plane of the wing. These wing flaps can be controlled by the pilot by a means hereinafter described either to pivot them simultaneously in the same direction to control the attitude of the aircraft in pitch or pivot them differentially to control the aircraft in roll.

At or near the tips of the wing are fastened vertical stabilizers 40 to which the rudders 42 are attached. At the front end of the fuselage 30 and in the plane of wing 32, there is mounted a rotor 44 of the double co-axial, counter-rotating type having two propellers 46 and 48 each provided with three blades. Propellers 46 and 48 are rotated in opposite directions by means hereinafter described. Rotor 44 is arranged to be pivoted about an axis extending transversely of the aircraft from a position extending approximately parallel to the plane of wing 32 as shown in FIG. 1 to a position projecting approximately normal to the wing 32 as shown in FIG. 3. In the position shown in FIG. 3, the plane is in a condition ready for take off. It is supported on the ground by a retractable landing gear 50 at the front end of fuselage 30 and by skids 52 at the wing tips attached to the vertical stabilizers 40.

The power plant arrangement of the plane is shown generally in FIG. 6. The power plant includes two engines 54 which are mounted within the wing 32 of the plane and arranged symmetrically with respect to the longitudinal axis of the plane. Each engine has a drive pulley 56 having a belt drive 58 with driven pulleys 60 mounted on stub shafts 62 which project outwardly from a gearbox 64 from which rotor 44 projects axially. Gearbox 64 is mounted on trunnions 66 (FIG. 7) so that it can swing in a vertical plane through an arc of about 90° between the positions shown in FIGS. 1 and 3. On the underside of wing 32 and on opposite sides of fuselage 30, air scoops 66 are mounted. These air scoops admit air into manifolds 68 which conduct cooling air around the engines and out through the exhaust ports 70 on the upper side of wing 32.

The belt drives 58 are equipped with idlers 72 which are controlled by handles 74 (FIG. 8) to adjust the belt tension and to act as clutches in starting up the engine. This type of drive is not only reliable, but also very simple and efficient. In case of failure of one or both engines, idlers 72 can be shifted to a position free of the belts 58 to disconnect the dead engine and thereby allow the rotors to operate without the drag of the dead engine. An automatic free wheeling clutch of conventional design may be used, if desired, to disconnect the dead engine. Gas tanks 74 are also mounted within wing 32.

The means for swinging rotor 44 and gearbox 64 to and from the positions shown in FIGS. 1 and 3 are best illustrated in FIGS. 8 and 9. These means include a yoke 78 pivoted on the gearbox and an extensible strut 80 connected with yoke 78 at one end and pivotally supported on the frame of the aircraft at its other end as by a bracket 82. The length of strut 80 can be increased or decreased to thereby swing gearbox 64 about trunnion 66 as an axis by either hydraulic or mechanical means. In the arrangement illustrated in the drawings, the means comprise a screw jack, the strut 80 comprising a screw and the bracket 82 supporting a nut 84 connected by gears not shown with a flexible shaft 86. Flexible shaft 86 is driven by a pair of friction wheels 88 which are supported by a double bell crank lever 90 such that either one or the other of friction wheels 88 is pressed into frictional contact with the end of one of the pulleys 60 when lever 90 is shifted in either direction from its neutral position. In the neutral position, neither of the wheels 88 engage the end of pulley 60, and the flexible shaft 86 is not rotated. Lever 90 is arranged to be actuated by a flexible push-pull control wire cable 92 connected to a grip 94 on a lever 96 which is mounted on the frame of the aircraft to pivot about the axis 98. When grip 94 is pushed forward, lever 90 is rotated to bring one of the wheels 88 into frictional contact with the end of pulley 60 to rotate drive shaft 86 in a direction such that the effective length of strut 80 is increased and the gearbox 64 is thus pivoted forwardly. When the hand grip 94 is pushed rearwardly, the gearbox 64 is pivoted upwardly from the position shown in FIG. 9.

When the gearbox 64 is in its extreme forward position, that is, in the position shown in FIG. 9 wherein the rotor axis is generally horizontally disposed, a cable 100 (FIG. 7) attached to the yoke 78 as at 102 deflects a cable 104 to move friction wheels 106 out of contact with the drive pulleys 56 of the engines. Friction drive wheels 106 drive fans 108 in manifolds 68. These friction drive wheels are normally biased into engagement with drive pulleys 56 by springs 110. However, when cable 104 is deflected as shown in FIG. 7 by the forward swinging movement of gearbox 64, friction wheels 106 are moved out of engagement with drive pulleys 56; and fans 108 are not driven. Thus, when the plane is hovering, the fans 108 are driven by the engines 54; but when the aircraft is flying in level flight, the fans 108 are disconnected since the forward speed provides enough pressure to force cooling air through the scoops 66 and manifold 68 to cool the engines.

Referring now to FIG. 10, the drive arrangement within gear box 64 is illustrated. The shafts 62 on which the drive pulleys 60 are mounted are provided with bevel gears 120. These two bevel gears 120 mesh with ring gears 122 and 124. Ring gear 122 is mounted on and drives a hollow shaft 126 on which the hub 128 of propeller 48 is rigidly mounted. Ring gear 124 is fixedly mounted on and drives hollow shaft 130 on which the hub 132 of propeller 46 is rigidly supported. The stub shafts 62 are concentric with the axis of trunnions 66 about which the gearbox 64 rotates. This arrangement allows the use of two identical engines 54 turning in the same direction to rotate the two propellers 46 and 48 in opposite directions. With this arrangement, it will be noted that the engine torques cancel out on the gearbox and the side loads on both sets of bevel gears 120 are also balanced out.

The rotor hubs 128 and 132 are each provided with three spindles 134 each of which rotatably supports a propeller blade 136 by means of bearings (not shown). The propeller blades 136 are rotatably supported on the spindles 134 to enable the pitch of the propellers to be varied. Each propeller blade 136 has an arm 138 (FIG. 11) rigidly connected thereto, and the arms 138 are actuated by links described hereinafter which can be actuated to produce several desired maneuvers of the ship by changing the pitch of the propellers. The pitch of the propeller blades is varied by the control system of the plane. Briefly stated, the control system is designed to enable collective pitch control, differential pitch control and cyclic pitch control.

Figure 15:
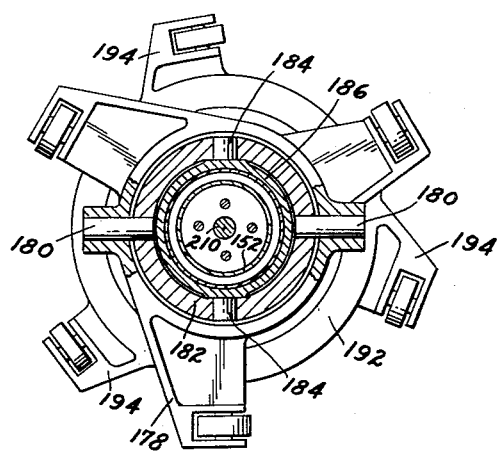
FIG. 15 is a sectional view taken generally along the line 15—15 in FIG. 10.

When it is necessary or desired to vary the rotor thrust, the pitch of all the blades on both propellers must be varied simultaneously. The pitch of the propeller blades is adjusted collectively by the collective pitch lever 96 (FIGS. 8 and 9) which acts through a link 140 to rotate a quadrant 142. A control cable 144 wraps around quadrant 142 and enters the rear end of gearbox 64 where it wraps around a drum 146 (FIG. 10) which is rotatably supported on gearbox 64 by bearings 148. Drum 146 is internally threaded and engages with the threaded end portion 150 of a tube 152. At its other end, tube 152 is provided with a pair of diametrically opposed pins 154 (FIG. 13) on which is pivotally supported a gimbal ring 156. Ring 156 in turn supports opposed pins 158 on which a spindle 160 is pivotally supported. Spindle 160 rotatably supports a swash plate 162 as by bearings 164. The swash plate 162 is fashioned with three inclined arms 166, the free ends of which support the walking beams 168 for pivotal movement about pins 170. A link 172 connects each of the arms 138 of the propeller 46 with one end of each walking beam 168. The other end of each walking beam 168 is connected by a link 174 passing through guides 176 with a second swash plate 178. Swash plate 178 is provided with diametrically opposed pins 180 (FIG. 15) which support a gimbal ring 182. Ring 182 in turn receives a pair of diametrically opposed pins 184 mounted on a sleeve 186 which is slidably supported on hollow shaft 130. The swash plate 178 is provided with a circumferential extension 188 on which is mounted a bearing 190. A spider 192 is rotatably supported on extension 188 of swash plate 178 by bearing 190. Spider 192 is provided with three arms 194 one each connected with the rigid arm 138 of propeller 48 by the push rod assembly 196. Push rods 196 are maintained parallel with the rotor axis by links 198 which, together with the arms 138 of the propeller blades, form a parallelogram linkage. The arrangement is such that when collective pitch lever 96 is pivoted upwardly, cable 144 rotates drum 146 in a direction such as to cause tube 152 to move axially forwardly or upwardly. Tube 152 is prevented from rotating by means of the scissors linkage 200 pivotally supported at one end by the inner end of the gearbox as at 201 and at the other end by the inner end of tube 152 as by bushings 203 (FIGS. 10 and 16). When tube 152 moves axially forwardly or upwardly, it carries with it the swash plate 162 which in turn moves the walking beams 166 axially upwardly or outwardly. This causes the blades of propeller 46 to rotate angularly in one direction and the blades of propeller 48 to rotate in the opposite direction to the same extent so that the pitch of the blades on both rotors is increased to the same degree.

Under normal conditions of hovering and forward flight, the two propellers exert equal and opposite torque reactions on the fuselage. In order to head the ship in a desired direction while in the hovering condition, it is necessary to unbalance these torques so that the resultant torque will rotate the ship in the desired direction. This is accomplished by increasing the pitch of the blades on one propeller while decreasing the pitch of the other propeller by the same amount. The means for effecting this differential pitch control of these propellers comprises a cable 202 (FIG. 9) which passes around a drum 204 rotatably mounted in the pilot compartment and provided with a handle lever 206. Cable 202 wraps around a second drum 208 at the rear or lower end of gearbox 64. Cable 202 is guided to and from drum 208 by tubular guides 209 (FIG. 16). Drum 208 is keyed to rotate with a shaft 210 extending axially through tube 152. At its forward end, shaft 210 is provided with a universal joint 212 to which is connected, as by a pin 213, a threaded stub shaft 214. An internally threaded sleeve 216 is mounted on the end of stub shaft 214. An inwardly projecting flange 217 on swash plate spindle 160 engages between universal joint 212 and a flange 219 on spindle 214, allowing spindle 214 to rotate but preventing it from moving axially relative to swash plate spindle 160. A key 218 on the spindle 160 of swash plate 162 engages a guideway 220 on sleeve 216 to prevent sleeve 216 from rotating. Thus, as shaft 210 is rotated, sleeve 216 is caused to move axially. A bearing 222 on sleeve 216 supports a hub 224 for rotation on sleeve 216. Hub 224 in turn supports three links 226 each of which is provided with a lug 228 to which the crank arms 230 of walking beams 168 are attached. With this arrangement, it will be observed that as sleeve 216 is moved axially into response of rotation of shaft 210, hub 224 and links 226 are correspondingly axially actuated. Links 226 in turn cause arms 230 to pivot walking beams 168 in either one direction or the other. Thus, the blades of both propellers 46 and 48 are rotated the same amount in the same direction as viewed in FIG. 11; and the pitch on one of the rotors is increased while the pitch on the other rotor is decreased to the same extent.

In the hovering condition and at low forward speeds, before the control surfaces have become effective, pitch and roll control of the ship is obtained by cyclic pitch variations of the rotor blades. For example, if while hovering, it is desired to roll to the left, the pitch of the blades on the right side of the rotor is increased and the pitch of those on the left side is decreased. Similarly, a nose-down pictching moment is produced by increasing the pitch of the aft blades and decreasing the pitch of the forward blades. These cyclic pitch variations are produced by two sets of control cables, one set being designated by the numerals 232a and 232b and the other set being designated by the numerals 234a and 234b (FIG. 18).

These cables are actuated by the control column assembly 236. This assembly includes a U-shaped control column 238 on which a control wheel 240 is rotatably supported. At the upper end of each leg, the U-shaped control column 238 is provided with a bracket 242 which is pivotally supported on the ship as at 244. A pair of quadrants 246 are pivoted independently of brackets 242 on the same axis 244. Quadrants 246 are provided with crank arms 248 and crank arms 248 are in turn connected by means of push-pull rods 250 with the wing flaps 38.

Control wheel 240 has a hub 252 provided with an integral sleeve 254 which is rotatably supported as by bearings 256 in sleeve 258 rigidly mounted on the lower end of control column 238. At its inner end, sleeve 254 supports a drum 260 to rotate therewith. An endless cable 262 wraps around drum 260 and then extends upwardly through the control column on each side thereof. The cable then wraps around the grooved portions 264 of the two quadrants 246 and over pulleys 266. Thus, when control wheel 240 is rotated in either one direction or the other, one of the quadrants 246 are pivoted in one direction and the other in the opposite direction, thereby actuating one of the flaps 38 upwardly and the other flap downwardly to cause the ship to roll provided the ship has sufficient forward speed.

A second drum 268 is mounted on hand wheel 240 by a shaft 270. Drum 268 is fixed on shaft 270, and shaft 270 is slidably and rotatably supported within sleeve 254. The end portion of shaft 270 within hub 252 is provided with an annular groove 272 in which a cam 274 is engaged. Cam 274 is located in an axially offset position at the end of a pin 276, the opposite end of which is provided with a control knob 278. The arrangement is such that control knob 278 may be actuated by the pilot's thumb to shift shaft 270 and the drum 268 axially toward and away from drum 260. Pins 280 on drum 268 are adapted to engage in openings 282 in drum 260 to optionally provide driving connection between these two drums. When drum 268 is moved forward, pins 280 engage holes in housing 258. These holes are so located that the lateral cyclic pitch control is locked in a neutral position when it is disengaged from the control wheel. Cable 232 wraps around drum 268. The two runs 232a and 232b of this cable extend upwardly through the opposite arms of the control column 238 and then extend into the rear end of gearbox 64. The control cables are enclosed within flexible casings (not shown) through guides 281a and 281b as is conventional.

A lever 284 (FIG. 18) is detachably connected to one of the quadrants 246 as by a plunger 286 to rotate therewith. Plunger 286 is arranged to be actuated to disconnect quadrant 246 and lever 284 if desired. Lever 284 is fashioned with a handle 285 to permit independent operation of the elevators and cyclic pitch controls, if necessary. The runs 234a and 234b are connected to opposite ends of lever 284 and also extend into the rear end of gearbox 64 through tubular guides 287a and 287b (FIG. 16). The two sets of cables 232 and 234 extend axially within the hollow tube 152 toward the front or upper end of the rotor. At the front or upper end of tube 152, there are mounted four quadrants 288, 290, 292 and 294. See FIGS. 10 and 14. Each of the quadrants are supported on brackets 296 fixed on tube 152. The pivotal connection between these members is provided by pins 298. Each quadrant is connected by a link 300 with a corresponding radial arm 302 on the swash plate spindle 160. Cable 234a wraps around quadrant 294. Cable 232a wraps around quadrant 288. Cable 234b wraps around quadrant 290, and cable 232b wraps around quadrant 292. With this arrangement, it will be seen that when cables 232a and 232b are actuated as by turning the hand wheel 240 when the two drums 260 and 268 are interconnected, the swash plate together with its spider 166 will pivot laterally about the universal joint 212. When the cables 234a and 234b are actuated by pivoting the control column 238 fore or aft, the quadrants 290 and 294 will be pivoted and in turn pivot the swash plate assembly in a direction fore or aft. Thus, since the blade actuating links 172 and 174 are connected with the ends of swash plate spider 166 through the walking beams 168, it is apparent that as the blades of each propeller rotate, the pitch on one blade is cyclically increased and decreased and the pitch of the other blade is simultaneously decreased and increased. This causes the ship to roll to the right or to the left or causes the nose of the ship to pitch upwardly or downwardly while in hovering condition.

The differential pitch control is employed for turning the ship in a horizontal plane. Thus, it may be advisable to interconnect the controls for the rudders 42 with the controls for the differential pitch of the propellers so that these two sets of controls may be operated simultaneously. Thus, referring to FIG. 9, it will be noted that the shaft 304 on which the drum 204 is supported also supports a second drum 306. A clutch member 308 is provided for optionally connecting and disconnecting drums 204 and 306. An endless cable 310 wraps around drum 306. The runs of cable 310 connect with rudder pedals 312, then extend around pulleys 314 and 316 and sectors 318 which are connected by links 320 with rudders 42. Thus, when clutch 308 is actuated to connect drums 204 and 306 together, the differential pitch of the propellers may be varied by actuating the rudder pedals 312. On the other hand, when the plane is flying in level flight, the clutch 308 may be actuated to disconnect drums 204 and 306 so that actuation of rudder pedals 312 will only control the operation of rudders 42.

Figure 14:
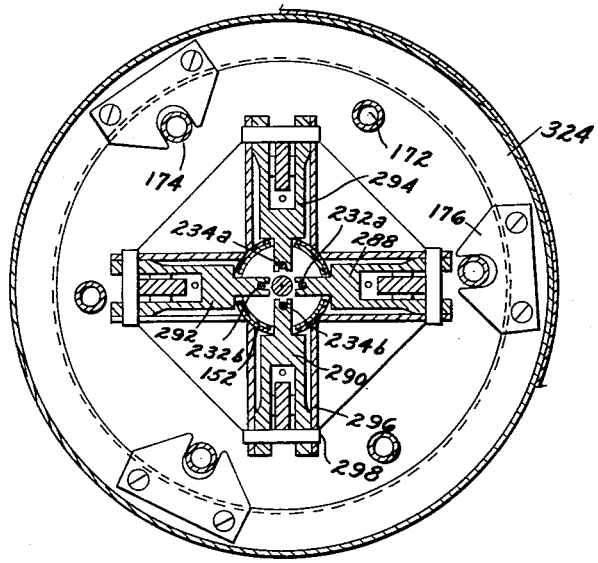
FIG. 14 is a sectional view taken generally along the line 14—14 in FIG. 10.

Referring now to FIGS. 10 and 14, it will be noted that the fairing 322 is mounted on the rotor by means of circular diaphragms 324 which are rigidly mounted to the hub 132 of the upper propeller 46 as by bolts 326. Diaphragms 328 and 330 which are mounted on hollow shaft 126 support the fairing 324 about the lower propeller. The arrows 331 and 333 indicate the leading edges of the upper and lower propeller blades, respectively.

Referring now back to FIGS. 1 through 5, it will be observed that the pivotal axis 334 of rotor 44, that is, the axis of trunnions 66, is located above and forwardly of the center of gravity 336 of the ship. This relative disposition of the axis of pivoting of rotor 44 and the center of gravity of the ship in combination with other design features of the ship provides a convertiplane design which renders the operation of the ship, particularly in take-off and landing, very safe.

In FIG. 3, the ship is shown resting on the ground in a position ready for take-off. In order to operate the ship, both engines are started and hand levers 74 are actuated to bring idlers 72 into engagement with the belts 58 thereby increasing the tension in the belt and causing the rotors to rotate. After the rotors are brought up to speed, the pitch of the rotor blades is collectively increased by rotating collective pitch lever 96 upwardly. As pointed out previously, this moves control cable 144 which wraps around drum 146 at the rear end of the gearbox 64. Rotation of drum 146 in the proper direction causes the tube 152 to be shifted axially upwardly, carrying with it the swash plate 162 and the walking beams 168. This movement of the walking beams 168 rotates the blades of the two rotors in opposite directions to increase the pitch of both rotors. If the pitch of the rotors is increased, the nose of the ship is lifted off the ground by reason of the rotor thrust. Since the center of gravity of the ship indicated at 336 is aft of the rotor axis, the skids 52 remain on the ground and the ship rotates upwardly about these skids. Skids 52 stabilize the ship laterally during take off. As the pitch of the rotor blades is collectively increased, the ship rotates upwardly about the skids 52 progressively to the positions shown in FIGS. 4 and 5. At the same time, the hand grid 94 is shifted forwardly to rotate the rotor 44 in a counterclockwise direction as viewed in FIGS. 3, 4 and 5 so that the rotor axis is held vertical. In the position shown in FIG. 5, it will be noted that the center of gravity 336 is aligned with the axis of rotor 44. A further increase in the thrust of the rotors by further increasing the pitch of the blades will cause the ship to rise vertically in the position shown in FIG. 5 and hover as a helicopter. In the position shown in FIG. 5, all normal helicopter maneuvers may be performed.

When it is desired to convert the plane to airplane type operation for level flight, the rotor 44 is swung forward with respect to the fuselage which causes the ship to accelerate in a forward direction. As the forward speed increases, the wing 32 assumes progressively greater lift until finally the rotor is in the horizontal position shown in FIG. 1. In this position, the delta wing 32 supplies all the lift. Up until this time, the helicopter controls on the rotor are available to hold the ship in any desired attitude. Thus, during the transition from FIG. 3 to FIG. 1, clutch 308 between drums 204 and 306 is engaged (FIGS. 8 and 9); and pins 280 interengage drums 260 and 268. However, the airplane controls, namely, the flaps 38 and rudders 42, do not become effective in controlling the ship until the forward speed has increased to a reasonably high value. After the forward speed has increased to a value sufficiently high to render the ship responsive to control by flaps 38 and rudders 42, the helicopter controls may be disconnected. Drum 204 is engaged from drum 306 so that the actuation of rudder pedals 312 operates only the rudders 42. Thumb knob 278 is rotated to shift drum 268 forwardly and thereby disengage drum 260, and clutch 286 is moved to disengage lever 284 from quadrant 246. Thereafter, manipulation of the control stick 238 and the wheel 240 is ineffective to vary the pitch of the propeller blades.

The operation of landing the plane is, of course, the reverse of the take-off operation described. In landing the ship, the helicopter controls are connected as described above and the rotor is gradually rotated to the vertical position, the pitch of the propellers being gradually decreased to progressively decrease the rotor thrust and thereby enable the plane to settle down slowly. In this connection, it will be noted that in case of power failure, the rotor is immediately swung to the vertical position and the blade pitch is adjusted to an angle which causes the aerodynamic forces to keep the propellers rotating. Under such conditions, the ship makes a landing similar to an autogyro, with both the motor and the wing supplying the necessary lift.

As pointed out previously, when the plane is hovering in the air in the position shown in FIG. 5, all the conventional helicopter maneuvers may be performed by varying the pitch of the propeller blades either collectively, differentially or cylically. The pitch of the propeller blades may be adjusted collectively in the manner indicated above by rotating collective pitch lever 96 upwardly or downwardly to increase and decrease respectively the pitch of all the blades and thereby increase or decrease the thrust of the rotor.

If it is desired to turn the ship in a horizontal plane, this may be accomplished either by actuating rudder pedals 312 in opposite directions if the clutch 308 is engaged or if the clutch 308 is not engaged, then by rotating drum 204 in either one direction or the other by means of handle 266. In either event, cable 202 will be moved; and consequently, the drum 208 at the rear end of gearbox 64 will be rotated. If the drum 208 is rotated in a direction such that the sleeve 216 and hub 222 are moved axially upwardly, then the walking beams 168 will be rotated by the crank arms 230 such that the blades of the upper and lower propellers 46 and 48 are turned in a clockwise direction as viewed in FIG. 11. Since these propellers are turning in opposite directions, the torque of one propeller will be increased while the torque of the other propeller will be decreased to the same extent. This produces a resultant torque on the ship which causes it to rotate in a horizontal plane so that the ship may be headed in the desired direction.

While hovering, the ship may be rolled either to the right or to the left by actuating the lateral cyclic pitch cables 232a and 232b and the ship may be nosed downwardly or upwardly by actuating the longitudinal cyclic pitch cables 234a and 234b. As explained previously, the lateral cyclic pitch cables 232a and 232b are actuated by turning the control wheel 240 in either one direction or the other, the cable 232 being wrapped around the drum 268 in the control column 236. On the other hand, the runs 234a and 234b of the longitudinal cyclic control cable are moved by pivoting the whole control column 236 about the axis 244.

If it is desired to roll the ship to the right, for example, control wheel 240 is turned to the right. This shortens the effective length of cable 232b and increases the effective length of cable 232a. Referring now to FIG. 10, it will be seen that when the effective length of cable 232b is decreased and that of 232a is increased, quadrants 288 and 292 are both pivoted about their respective pivot axes 298 in counterclockwise directions. This causes the swash plate assembly at the upper end of the rotor to tilt to the right or upwardly as viewed in FIG. 10 about the pins 158 of the gimbal ring connection between swash plate spindle 160 and the end of tube 152 as an axis. With the swash plate assembly tilted in this manner, it will be appreciated that as each blade rotates to a position at the right of the plane, its pitch will be decreased; and as the blade reaches a position to the left of the ship, its pitch will be increased. Thus, the ship is caused to roll to the right.

It will be seen that the convertiplane construction described herein posseses unique features both in general design and specific construction which are definitely advantageous in an aircraft of this type. In the first place, the use of a delta wing is very desirable since it has high stability at high angles of attack. At high angles of attack, considerable turbulence is set up behind the wing. Thus, the positioning of the vertical stabilizers 40 and the rudders 42 at the opposite ends of the delta-wing is desirable since they are in a position where they will be highly effective to control the ship, thus further increasing its stability at high angles of attack. In addition, the stabilizers provide a very convenient means for mounting the ground skids 52 on the ship which would otherwise have to be mounted on some sort of structure extending downwardly from the wing tips. The wide spacing of the stabilizers at the ends of the delta wing is desirable also in that the effective aspect ratio is increased since these stabilizers tend to limit the tendency for the air flowing past the wing tips to circulate around the ends of the wing rather than being directed beneath the wing.

Another desirable feature of the construction herein described lies in the placement of the wing 32 between the fuselage 30 and the rotor 44. This relative arrangement provides maximum visibility and safety since the wing is positioned between the passengers and the rotor. This feature could be of considerable importance in case it is necessary to bail out, because the ship might be falling rather rapidly and a person bailing out might otherwise be thrown into the path of the rotors.

It will also be observed that the pilot and passengers are always located either below or rearwardly of the plane of rotation of the rotors. This is important from the standpoint of the possibility of the rotors disintegrating or falling apart. In this event, they will not be thrown in the direction of the occupants of the plane.

The nose-up attitude in which the ship takes off is advantageous since it minimizes interference between the wing and the rotor downwash. It is obvious that if the wing were in a horizontal position directly beneath the rotor, a serious loss of lift would occur, since the rotor would simply blow air against the wing. This is avoided by allowing the wing to tilt up during take-off.

As engine power is increased to obtain higher speeds, sufficient rotor thrust for vertical flight can be obtained with smaller diameter rotor. In this case, the velocity of the air leaving the rotor is increased, since the rotor thrust is proportional to the amount of air affected times its final downwash velocity. Thus the consideration of wing interference becomes more important with higher performance convertiplanes.

In these higher performance models, the rotor downwash becomes great enough to make the control surfaces fairly effective, even in hovering. This is an advantage, since the smaller diameter rotor cannot exert as high control forces as a larger one would. Also the design is simplified since some or all of the cyclic and differential rotor controls may be eliminated.

With a small diameter rotor, it is of advantage to add an all-movable vertical control surface at the center line of the aircraft, where the rotor downwash has its maximum value. In this case, the rudders would be eliminated from the wing tips, leaving only the fixed, or stabilizing, surfaces at the wing tips.

Other variations of the configuration are possible, such as elimination of the belt drives by connecting the engines directly to the gearbox, or swivelling the entire power plant and rotor assembly about a transverse axis. This latter scheme would be suitable for a gas turbine power plant.

A further desirable feature in the use of a delta wing lies in the fact that increased thickness of this type of wing enables the placement of the engines symmetrically of and in an outboard relation to the fuselage. In the event of a bad landing, etc. if the engines should break loose, they would be thrown clear of the fuselage and the occupants of the plane. In addition, with a delta wing construction, the wing itself is the main structural part of the ship. The wing carries the load and not the fuselage. Therefore, the fuselage can be of lighter construction, permitting the use of larger doors, doors on both sides, windows, etc. which makes for greater visibility and accessibility.

The use of the delta wing construction in combination with the rotor described achieves a further desirable result. In the case of a power failure during flight, the rotor is immediately swung to a vertical position where it continues to free wheel and produce lift. The minimum sinking speed is maintained by maintaining a reasonable forward speed which allows the wing to contribute lift. The delta wing has a characteristic that very high lift coefficients can be obtained provided that the aircraft can be trimmed, that is, has powerful enough controls so that it can be held steadily in the proper attitude. When the delta wing is used in a normal tailless airplane, a high angle of attack is necessary as high lift can be obtained only by upward deflection of the trailing edge flaps. These produce a down load on the tail which tends to tip the nose of the plane upward. Obviously, this is a very inefficient method of trimming an aircraft and results in a large loss of lift. In the present design, this undesirable condition is avoided because at high angles of attack, the rotor can be used to hold the wing in the correct attitude. With the rotor described herein, very large control moments can be exerted on the wing. Control moments sufficiently powerful to trim the aircraft at high angles of attack even with the edge flaps 38 deflected downward are obtainable. Deflecting the trailing edge flaps downwardly allows the wing to develop more lift at a lower angle of attack and with less drag than a wing with its flaps neutral. Thus, with a convertiplane of the instant design, it is possible to obtain maximum efficiency out of both the wing and the rotor in a power-off landing thereby reducing the danger involved in this maneuver.

It will be appreciated, of course, that although the convertible plane shown and described herein is designed to accommodate one person, a pilot in a prone position, this showing has been made only for the purpose of illustrating one type of design for a small and very compact ship. The invention, however, is not limited to this single design. The principles of the present invention apply equally to larger ships where a minimum size is not a primary aim. Thus, with other designs of convertiplanes constructed in accordance with this invention, the controls may be arranged to be operated by a pilot in a conventionally seated position.

We claim:

1. A convertiplane comprising a fuselage, a wing on the fuselage, a rotor mounted on the fuselage for pivotal movement from a generally horizontal position for level flight to a generally vertical position for take-off, landing and hovering, a pair of counter-rotating propellers coaxially mounted on said rotor, an engine for driving said propellers, a manifold for conducting cooling air around said engine, said manifold having an inlet forming a generally horizontally disposed air scoop opening towards the front of the plane, fan means in said manifold for driving cooling air therethrough, driving means for said fan means and means responsive to the pivotal movement of said rotor from said horizontal position to establish a driving connection between said driving means and said fan means.

2. A convertiplane having a wing, the leading edges of which are swept back sharply, aerodynamic control surfaces adjacent the trailing edge of the wing, a fuselage fixedly attached to the wing generally on the underside thereof, the fuselage having a longitudinal axis passing through the center of gravity of the convertiplane which is generally parallel to and spaced below the plane of the wing, means for propelling the aircraft comprising a rotor means pivotally mounted on the convertiplane exclusively adjacent the nose of the wing forwardly and above said center of gravity, said rotor means being pivotable about a transverse axis parallel to the plane of the wing such that the rotor thrust axis can be rotated to any position in the plane of symmetry from a position normal to the plane of the wing to a position parallel to the plane of the wing and ground supports for positioning the wing and fuselage in a generally horizontal attitude when resting on the ground, said ground supports comprising a pair of laterally spaced supports mounted on the aircraft and extending below and rearwardly of said control surfaces of the convertiplane so that adequate ground clearance is maintained when the nose of the aircraft is tilted upwardly about said rear ground supports to a position wherein the line extending through the center of gravity of the aircraft and the pivotal axis of the rotor is vertical.

3. A convertiplane having a wing, the leading edges of which are swept back sharply, aerodynamic control surfaces adjacent the trailing edge of the wing, a fuselage fixedly attached to the wing generally on the underside thereof, the fuselage having a longitudinal axis passing through the center of gravity of the convertiplane which is generally parallel to and spaced below the plane of the wing, means for propelling the aircraft comprising a single lifting rotor mounted on trunnions located adjacent the nose of the wing and in the plane thereof and forwardly and above said center of gravity, said rotor being pivotable about a transverse axis parallel to the plane of the wing such that the rotor thrust axis can be rotated to any position in the plane of symmetry from a position normal to the plane of the wing to a position parallel to the plane of the wing and ground supports for positioning the wing and fuselage in a generally horizontal attitude when resting on the ground, said ground supports comprising a pair of laterally spaced supports mounted on the aircraft and extending below and rearwardly of said control surfaces of the convertiplane so that adequate ground clearance is maintained when the nose of the aircraft is tilted upwardly about said rear ground supports to a position wherein the line extending through the center of gravity of the aircraft and the pivotal axis of the rotor is vertical.

4. A convertiplane as called for in claim 3 wherein said rotor includes a pair of counter-rotating propellers.

5. A convertiplane having a wing provided with leading edges which are swept back sharply and a trailing edge which is generally straight and normal to the plane of symmetry, said wing having a relatively low aspect ratio, aerodynamic control surfaces adjacent the trailing edge of the wing, a fuselage attached to the underside of the wing and extending generally from the nose of the wing to its trailing edge, the fuselage having a longitudinal axis passing through the center of gravity of the convertiplane which is generally parallel and spaced below the plane of the wing, a single lifting rotor mounted on trunnions located at the nose of the wing, forwardly and above said center of gravity and generally in the plane of the wing, said rotor being pivotally mounted such that the rotor thrust axis can be rotated in the plane of symmetry from a position normal to the wing to a position parallel to the wing and ground supports for positioning the wing and the fuselage in a generally horizontal attitude when resting on the ground, said ground supports comprising a pair of laterally spaced supports mounted on the aircraft and extending below and rearwardly of said control surfaces of the convertiplane so that adequate ground clearance is maintained when the nose of the aircraft is tilted upwardly about said rear ground supports to a position wherein the line extending through the center of gravity of the aircraft and the pivotal axis of the rotor is vertical.

6. The method of executing a generally vertical take-off followed by horizontal flight with an aircraft provided with a fuselage having a fixed-wing and a single tiltable rotor mounted forwardly of the above the center of gravity of the aircraft from an at-rest position wherein the aircraft is resting on the ground with the plane of the wing oriented generally horizontally which comprises tilting the aircraft nose upwardly by utilizing the thrust of the rotor in a generally vertical lifting position causing the aircraft to lift from the ground with the plane of the wing oriented generally vertically and thereafter tilting the rotor axis gradually forwardly to produce an increasing forward accelerating force which raises the wing to a horizontal position for forward flight by utilizing the lift on the wing resulting from the forward velocity produced by the forward inclination of the rotor axis.

7. The method of executing a generally vertical take-off followed by horizontal flight with an aircraft provided with a fuselage having a fixed-wing and a single tiltable rotor mounted forwardly of and above the center of gravity of the aircraft from an at-rest position wherein the aircraft is resting on the ground with the plane of the wing oriented generally horizontally which comprises progressively tilting the aircraft fuselage and wing nose upwardly by utilizing the thrust of the rotor in a generally vertical lifting position until a point is reached wherein the thrust axis of the rotor passes through the center of gravity of the aircraft to thereby cause the aircraft to lift from the ground with the plane of the wing oriented generally vertically and thereafter tilting the rotor axis gradually forwardly to produce an increasing forward accelerating force which progressively raises the wing to a horizontal position for forward flight by utilizing the lift on the wing resulting from the forward velocity produced by the forward inclination of the rotor axis.

8. The method as called for in claim 7 wherein the aircraft is tilted to said nose-upward position while maintaining the rear portion of the aircraft on the ground.

9. The method as called for in claim 7 wherein the aircraft is stabilized laterally while being tilted to said nose-upward position by providing laterally spaced ground supports at the rear of the aircraft and tilting the aircraft nose upwardly about said ground supports while the ground supports are resting on the ground.

10. A convertiplane having a wing provided with leading edges which are swept back sharply and a trailing edge which is generally straight and normal to the plane of symmetry, said wing having a relatively low aspect ratio, aerodynamic control surfaces adjacent the trailing edge of the wing, a fuselage attached to the underside of the wing and extending generally from the nose of the wing to its trailing edge, a single lifting rotor mounted on trunnions located at the nose of the wing and generally in the plane of the wing, said rotor being pivotally mounted such that the rotor thrust axis can be rotated in the plane of symmetry from a position normal to the wing to a position parallel to the wing and ground supports for positioning the wing and the fuselage in a generally horizontal attitude when resting on the ground, said ground supports including at least one support positioned forwardly of the center of gravity of the convertiplane and two laterally spaced supports mounted forwardly of and beneath said control surfaces and extending rearwardly of said control surfaces of the convertiplane so that adequate ground clearance is maintained when the nose of the aircraft is rotated upwardly about said rear ground supports to a position wherein the line extending through the center of gravity of the aircraft and the pivotal axis of the rotor is vertical.

References Cited in the file of this patent
UNITED STATES PATENTS

| | | |
|---|---|---|
| 1,049,927 | Sieg | Jan. 7, 1913 |
| 1,353,501 | Vogelsang | Sept. 21, 1920 |
| 1,547,564 | Dornier | July 28, 1925 |
| 1,775,861 | Lehberger | Sept. 16, 1930 |
| 1,875,267 | Savoja | Aug. 30, 1932 |
| 1,903,345 | Steinmann | Apr. 4, 1933 |
| 2,381,596 | Jensen | Aug. 7, 1945 |
| 2,423,625 | Smith | July 8, 1947 |
| 2,448,392 | Quady | Aug. 31, 1948 |
| 2,478,847 | Stuart | Aug. 9, 1949 |
| 2,481,748 | Hiller | Sept. 13, 1949 |
| 2,629,570 | Carnahan | Feb. 24, 1953 |
| 2,669,308 | Thomson | Feb. 16, 1954 |

FOREIGN PATENTS

| | | |
|---|---|---|
| 21,625 | Great Britain | 1912 |
| 45,991 | Austria | Jan. 25, 1911 |
| 272,905 | Germany | Apr. 14, 1914 |
| 865,010 | France | Feb. 10, 1941 |
| 1,017,040 | France | Sept. 10, 1952 |